United States Patent [19]

Piccioli et al.

[11] Patent Number: 4,539,463

[45] Date of Patent: Sep. 3, 1985

[54] TRIMMING OF POLYESTER CONTAINERS USING A LASER

[75] Inventors: David P. Piccioli, Auburn; Ieuan L. Harry, Nashua; Richard E. Clark, Merrimack, all of N.H.

[73] Assignee: Continental Packaging Company, Inc., Stamford, Conn.

[21] Appl. No.: 644,471

[22] Filed: Aug. 27, 1984

Related U.S. Application Data

[63] Continuation-in-part of Ser. No. 583,543, Feb. 24, 1984.

[51] Int. Cl.³ .............................................. B23K 26/00
[52] U.S. Cl. ...................... 219/121 LG; 219/121 LN; 219/121 LF; 219/121 FS; 264/25; 264/536; 425/527; 425/806
[58] Field of Search ................. 219/121 LG, 121 LN, 219/121 LU, 121 LV, 121 LP, 121 LE, 121 LF, 121 ES; 156/DIG. 80; 264/1.4, 22, 25, 536; 425/806, 527

[56] References Cited

U.S. PATENT DOCUMENTS 3,534,472 10/1970 DeJong et al. .......... 219/121 LY X
3,916,144 10/1975 Schuermann ............ 219/121 LY X

*Primary Examiner*—C. L. Albritton
*Attorney, Agent, or Firm*—Charles E. Brown

[57] ABSTRACT

A plastic jar is formed by blow molding a combination adapter and jar and thereafter the jar is cut from the adapter utilizing a laser beam. The jar may be blow molded from a preform which is of an injection molded laminated construction so that the wall of the jar is formed of plural layers. The head generated by the laser beam will melt and bond together these layers as opposed to permitting delamination as would occur should the jar be cut from the adapter by a knife or the like. The cut surface of the jar forms the mouth defining surface of the jar and it is preferred that the cut be inclined at a slight angle to a plane normal to the axis of the jar. Damage to the diametrically opposite surface of the jar by portions of the laser beam being utilized for cut off passing through the jar is prevented by a pressurized gas supply tube which is in the path of the laser beam and serves as an absorber for stray rays. This abstract is not to be construed as limiting the claims of the application.

12 Claims, 3 Drawing Figures

FIG.1
FIG.2
FIG.3
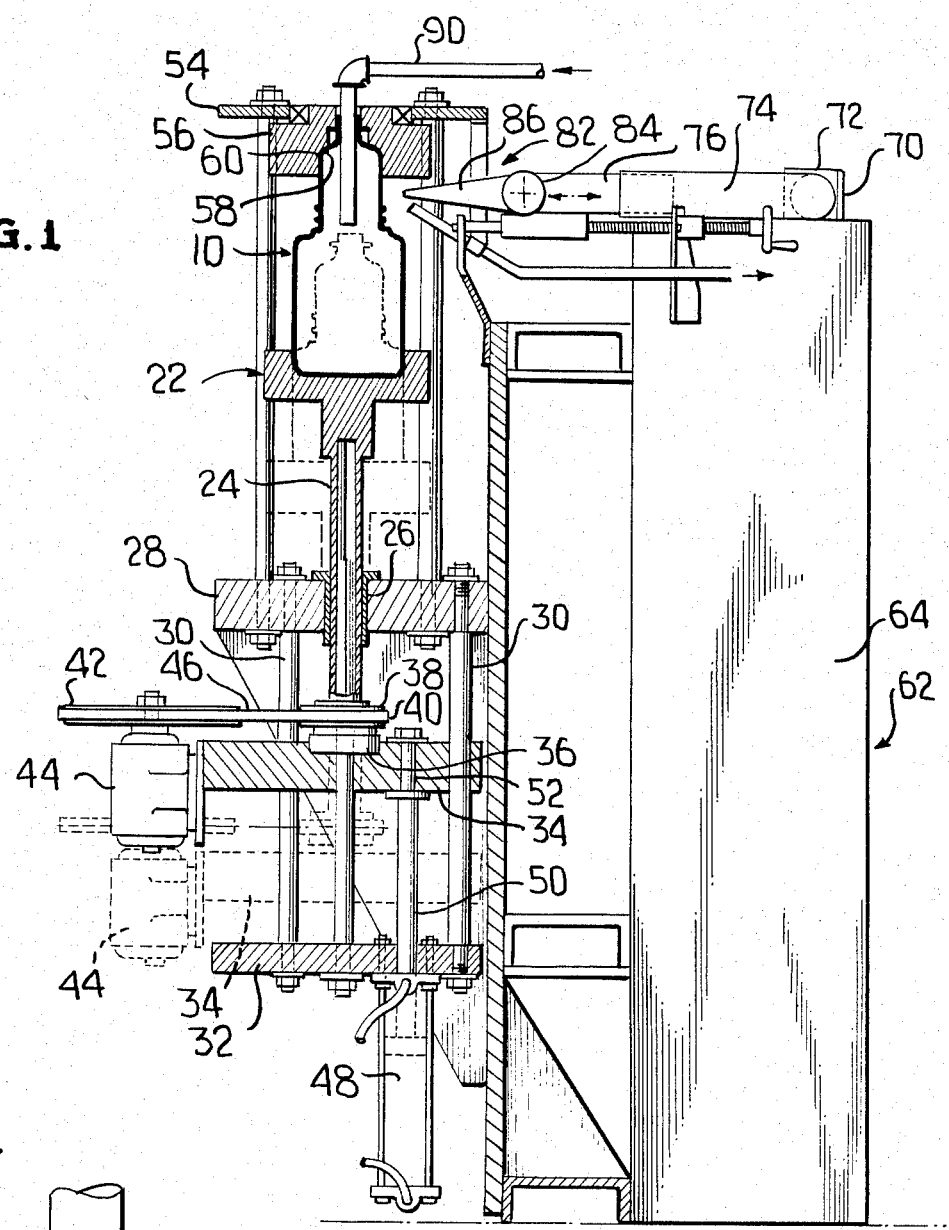
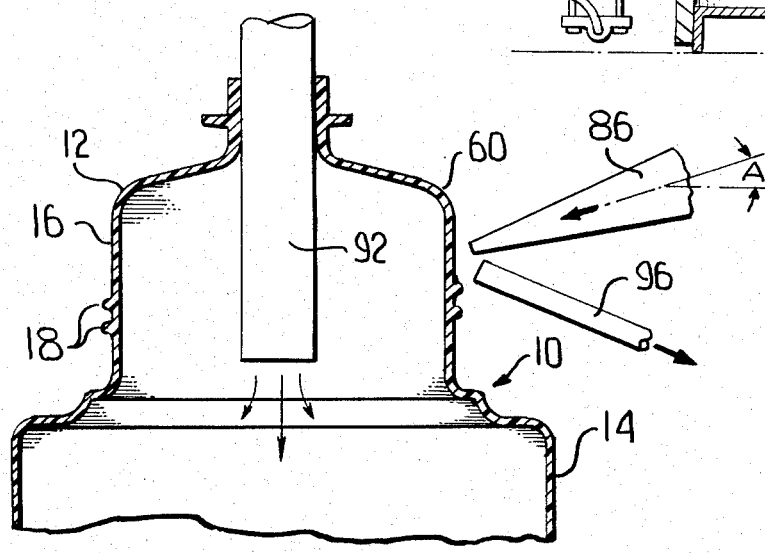
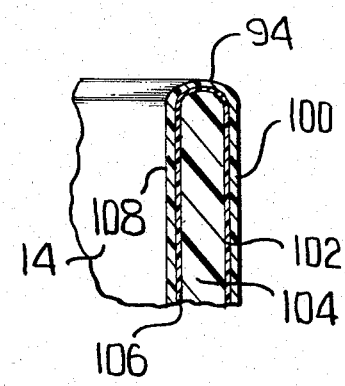

4,539,463

TRIMMING OF POLYESTER CONTAINERS USING A LASER

This application is a continuation-in-part of our co-pending application Ser. No. 583,543, filed Feb. 24, 1984, now pending.

This invention particularly relates to the formation of plastic jars wherein an intermediate article of manufacture in the form of a combination adapter and jar is blow molded and then the jar is divided from the adapter by cutting the same utilizing a laser beam.

The invention on the one hand particularly relates to the cutting of a jar from an adapter at an angle to provide a desired sealing surface defining the mouth of the jar. This inclined sealing surface tapers radially inwardly and downwardly and thus, when the laser beam cuts through the plastic material, it would normally have a tendency to strike the diametrically opposite surface of the interior of the jar in a detrimental manner. This problem is solved by forming a conduit for pressurized gas which is used internally to pressurize the combination adapter and jar during the cutting operation in the form of a metal pipe which will project into the jar sufficiently to be in the path of the laser beam and to absorb the same.

Another feature of the invention is that the combination adapter and jar is of a laminated construction wherein an injection molded preform is utilized in the blow molding of the combination adapter and jar and wherein the heat generated by the laser beam serves to effect a melting and flowing of the various layers of the jar along the cut sealing edge to cause a bonding of the laminations.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is an elevational view with parts broken away and shown in section of apparatus for cutting in two a combination adapter and jar in accordance with this invention.

FIG. 2 is an enlarged fragmentary elevational view with parts in section showing more specifically the relationship of the apparatus including the laser beam nozzle with respect to a combination adapter and jar.

FIG. 3 is an enlarged fragmentary sectional view taken through an upper portion of the cut off jar and shows the manner in which the flow of laminations thereof is bonded together at the sealing surface of the jar.

The apparatus shown in FIG. 1 is essentially that disclosed in our copending application Ser. No. 583,543. In the simplest form of the invention there is provided a support 22 for receiving a base portion of the combination adapter and jar which is identified by the numeral 10. The support 22 is carried by a shaft 24 which is mounted for rotation and for axial movement. The shaft 24 is rotatably journalled in a bearing 26 carried by a mounting plate 28, and depending from the mounting plate 28 is a plurality of guide rods 30 which have their lower ends fixed to a lower support plate 32.

The guide rods 30 have mounted thereon for movement axially of the combined adapter and jar 10 a plate 34 which has connected thereto by means of a rotary coupler 36 a drive unit 38 which is secured to the shaft 24 for rotation therewith. The drive unit 38 includes a sprocket or pulley 40 which is coupled to a similar sprocket or pulley 42 carried by a motor 44, the coupling being by means of a drive belt or chain 46.

At this time it is to be noted that the motor 44 is fixedly secured to the support plate 34 for movement therewith. The coupler 36 also couples the shaft 24 to the plate 34 for movement therewith.

The plate 32 carries an extensible fluid motor 48 which includes an extensible shaft 50 having an upper portion 52 which is fixedly secured to the plate 34. In this manner the plate 34 may be moved along an axis identified by the guide rods 30 moving the support 22 in an axial direction while it is being rotated by the motor 44.

The mechanism also includes a top plate 54 which has rotatably journalled therein an upper support 56 for the upper part of the blow molded combination adapter and jar 10.

It is to be understood that the support 56 is internally configurated to define a shoulder 58 which will engage a shoulder 60 of the adapter portion of the combined adapter and jar 10. This engagement serves accurately to position the combined adapter and jar 10 along the axis defined by the rods 30.

At this time it is pointed out that in the combined adapter and jar 10 the adapter is identified by the numeral 12 and the jar is identified by the numeral 14. The adapter 12 and the jar 14 have a common upper portion 16 along which the combined adapter and jar 10 is to be cut to separate the jar 14 from the adapter 12. The jar 14 may be of a conventional type and will be provided with suitable threads 18, either continuous or interrupted, to facilitate the removable securement of a closure (not shown).

The mechanism will also include a conventional laser beam generator 62 which may be suitably mounted within a cabinet 64. If desired, the plates 28 and 32 may be fixedly secured to the cabinet 64 by way of suitable brackets.

The details of the laser beam generated by the generator 62 are not completely shown here in that they do not form a part of the invention. It is to be understood, however, that a laser beam is directed through a suitable protective tube 70 to a reflective prism 72 which changes the direction of the beam so that the beam is directed generally toward the intended portion of the combined adapter and jar 10. The deflected beam passes through another protective housing 74 which is telescoped relative to a similar protective housing 76.

The laser system also includes a beam directing head 82 which is provided with a housing portion 84 which is rotatably journalled on the housing 76. The housing portion 84 carries a nozzle-like head element 86 and is rotatable about the axis of the laser beam. The housing portion 84 will carry still another beam deflecting prism (not shown) for directing the laser beam through the head element 86. It is to be understood that the head element 86 will have therein at least one focusing lens wherein the laser beam will be focused at a predetermined distance from the head element 86.

The laser system will include suitable adjustment means for adjusting the angle at which the laser beam strikes the combination adapter and jar 10 and for moving the head member 86 away from and toward the combination adapter and jar 10.

In order that the combination adapter and jar 10 may be internally pressurized at the time the jar 14 is being severed from the adapter 12, there is provided an air pipe 90 which has a lower portion 92 thereof extending into the combination adapter and jar 10 in generally sealed relation with respect thereto. As will be specifically described in detail hereinafter, the pipe portion 92 extends considerably into the combination adapter and for a further and beneficial purpose.

It is to be understood that when the jar 14 is cut off with respect to the adapter 12, there will be formed a mouth defining sealing edge for the jar 14, such sealing edge being best shown in FIG. 3 and identified by the reference numeral 94. It has been found that the sealing edge 94 should taper radially inwardly and downwardly at a slight angle. An angle on the order of 15° to a plane disposed normal to the axis of the jar 14 has been found to be most effective. To this end, the head member 86 of the laser system, which head member functions as a nozzle, is tilted downwardly as clearly shown in FIG. 2. The inclination is at an angle A to a plane normal to the axis of the jar 14. As indicated above, this angle A is preferably on the order of 15°.

It will be readily seen that because the laser beam strikes the combination adapter and jar 10 at a downward angle, any portion of that laser beam passing through the cut off area will strike the interior of the jar 14 diametrically opposite to the area of the cut off. Such laser beam stray rays could undesirably damage the jar. Accordingly, the pipe portion 92 is formed of metal and the head member 86 is so directed whereby any laser beam rays passing through the interior of the jar 14 will strike and be absorbed by the pipe portion 92.

In order that any residue and smoke which may result from the cutting action of the laser beam may be immediately dispensed with, there is provided a suction line 96 having an open end disposed as close as possible to the area wherein the laser beam is effecting a cutting action.

With particular reference to FIG. 3 and further with respect to the construction of the jar 14, it is pointed out here that the jar 14 is preferably formed from an injection molded laminated preform (not shown). Due to the laminated construction of the preform, the wall of the jar 14 will also be of a laminated construction. In a typical embodiment of the invention, starting from the exterior of the jar 14, there will be an outer layer 100 of a suitable polyester resin material which is compatible with the product being packaged. Next, there is a barrier layer 102. Following this, there is a central core 104. Both the barrier layer 102 and the core 104 must be formed of a thermoplastic material compatible with the polyester resin material of the layer 100.

Inwardly of the core 104 is another barrier layer 106 which is identical to the barrier layer 102. Finally, the interior of the jar 14 is defined by a layer 108 which will be of the same polyester resin material as the layer 100.

Because the various layers are injection molded with the layers 100 and 108 being generally in the form of a cylindrical sleeve and the barrier layers 102, 106 being integrally formed as a sleeve within the sleeve defined by the layers 100, 108, and finally with the core 104 being injected into the sleeve defined by the layers 102, 106, it is not absolutely necessary that the bond between the various layers be one which would not delaminate should the jar be cut, for example, by a knife. However, in accordance with this invention, the heat generated by the laser beam in cutting the jar 14 from the adapter 12 also serves to melt the various materials of the several layers at the point of cut off, and this melting results in the bonding together of the layers to form a smooth sealing surface with which gasket material of a conventional closure may form a required seal. Thus, the sealing surface 94 is not in the form of a cut edge, but generally is in the form of a smooth bead-like surface.

Although only a preferred embodiment of the invention has been specifically illustrated and described herein, it is to be understood that minor variations may be made in the configuration of the jar which is being formed, the laminated construction of the jar, and the application of the laser beam in cutting the jar from its companion adapter without departing from the spirit and scope of the invention as defined by the appended claims.

What is claimed as new is:

1. An apparatus for cutting off plastic containers from a combination container and adapter to provide an open mouth defined by a sealing edge, said apparatus comprising support means for supporting a combination container and adapter for rotation about a fixed axis, means for directing a laser beam generally towards said axis at a position along said axis to separate a container from an adjoining adapter with said laser beam being inclined to said axis towards the intended position of a container to form in such container a sealing surface, and absorber means positioned relative to said support for reception within and removal from a combination container and adapter to be cut for intercepting any laser beam passing through a combination container and adapter after cutting therethrough to prevent damage to such container remote from an area of cut off.

2. An apparatus according to claim 1 wherein said absorber means is a duct for supplying air into a combination container and adapter during laser cutting.

3. An apparatus according to claim 2 wherein said duct is a metal tube.

4. An apparatus according to claim 1 wherein the inclination of said laser beam to said fixed axis is on the order of 15°.

5. A method of forming a plastic container having a mouth sealing surface, said method comprising the steps of providing a multi-layer combination adapter and container formed generally symmetrical about an axis, mounting the combination adapter and container for rotation about the axis, and while rotating the combination adapter and container using a concentrated laser beam to cut the container from the adapter along an intended mouth sealing surface and utilizing the heat from the laser beam fusing together the plural layers at said sealing surface.

6. A method according to claim 5 wherein the laser beam is inclined downwardly from a plane normal to the axis to form the sealing surface at a downwardly sloping angle to the normal plane.

7. A method according to claim 6 wherein the angle is on the order of 15°.

8. A method according to claim 6 wherein absorber means are placed into the combination adapter and container through the adapter to intercept portions of the laser beam which pass through the combination adapter and container to prevent damage to the container remote from the cutting thereof.

9. A method according to claim 8 wherein a compressed gas is introduced into the combination adapter and container through the absorber means to internally pressurize the combination adapter and container.

10. A method of forming a plastic container having a mouth sealing surface, said method comprising the steps of providing a combination adapter and container formed generally symmetrical about an axis, mounting the combination adapter and container for rotation about the axis, and while rotating the combination adapter and container using a concentrated laser beam to cut the container from the adapter along an intended mouth sealing surface, the laser beam being inclined downwardly from a plane normal to the axis to form the sealing surface at a downwardly sloping angle to the normal plane, and placing within the combination adapter and container through the adapter absorber means for intercepting portions of the laser beam which pass through the combination adapter and container to prevent damage to the container remote from the cutting thereof.

11. A method according to the claim 10 wherein a compressed gas is introduced into the combination adapter and container through the absorber means to internally pressurize the combination adapter and container.

12. A method according to claim 10 wherein the angle is on the order of 15°.

* * * * *